Figure 1:
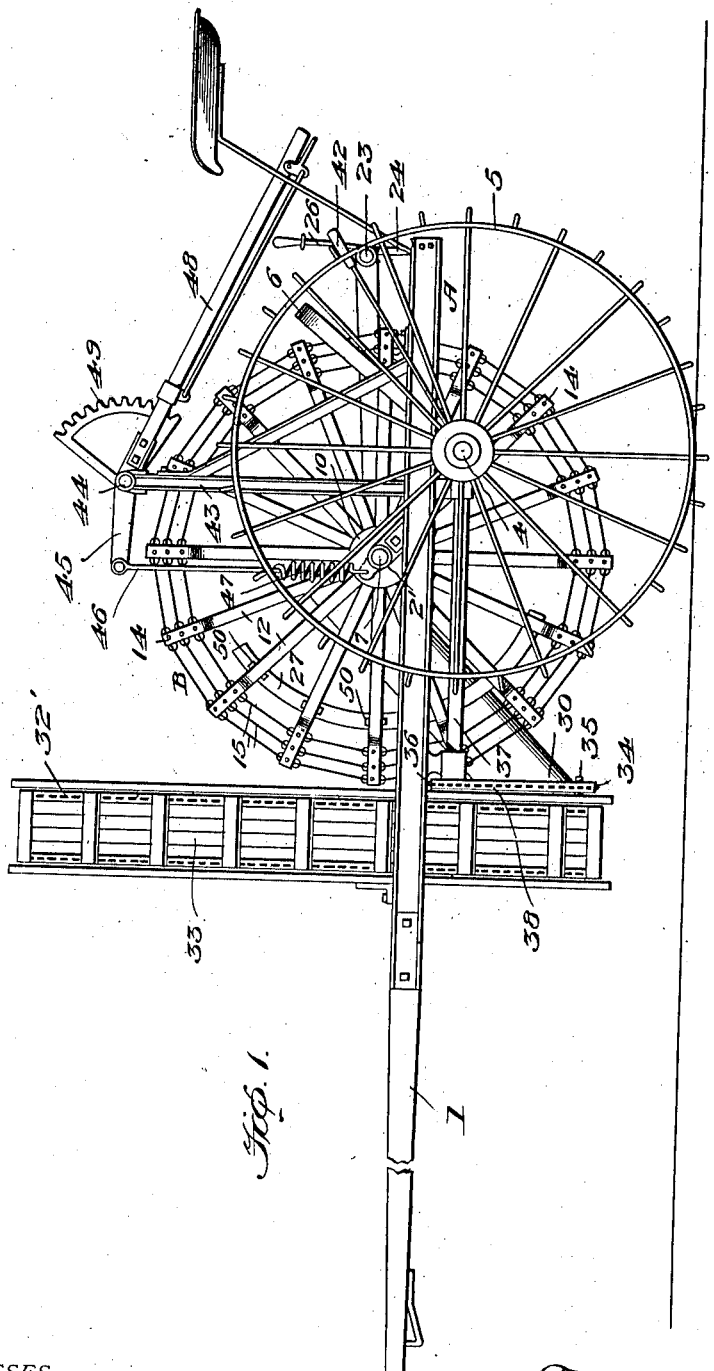

E. A. CADWALLADER.
BEET PICKER.
APPLICATION FILED FEB. 3, 1912.

1,048,457.

Patented Dec. 24, 1912.
3 SHEETS—SHEET 1.

WITNESSES

INVENTOR
Elisha A. Cadwallader
his Attorneys

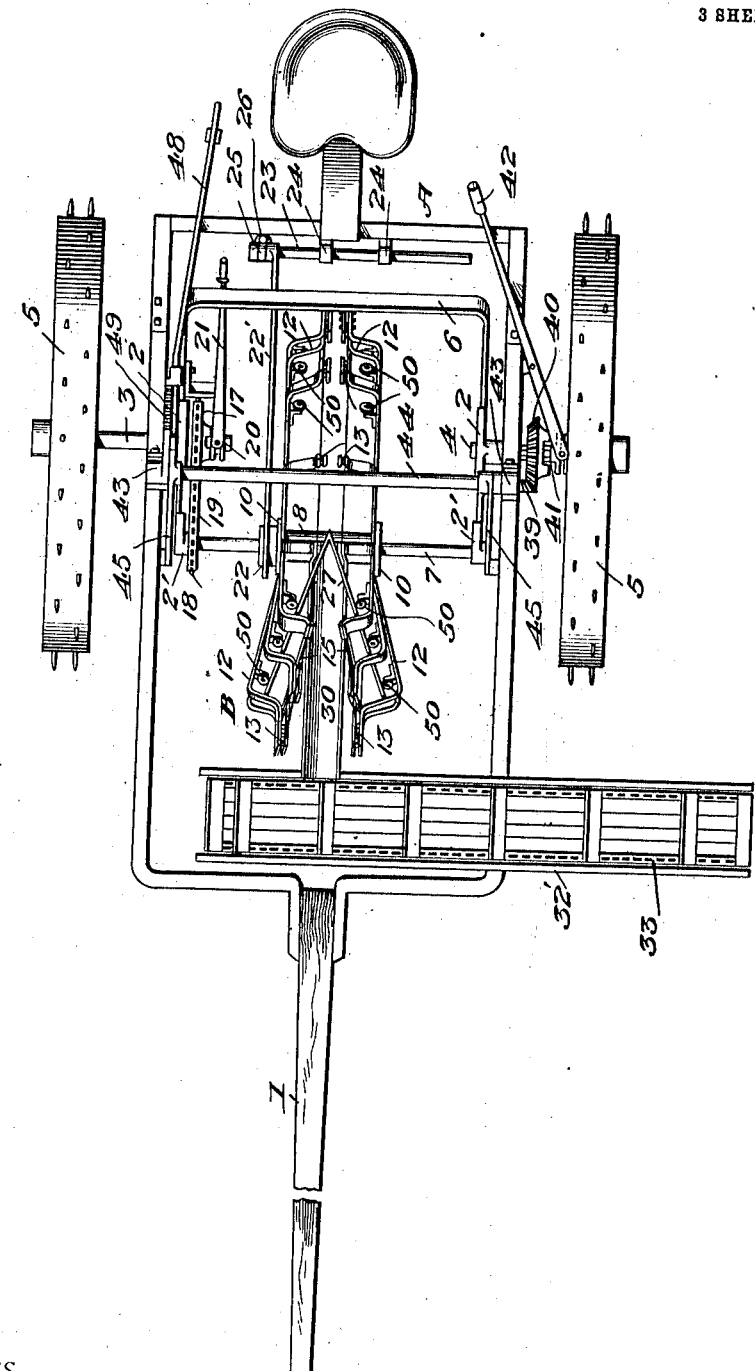

E. A. CADWALLADER.
BEET PICKER.
APPLICATION FILED FEB. 3, 1912.
1,048,457.
Patented Dec. 24, 1912.
3 SHEETS—SHEET 3.
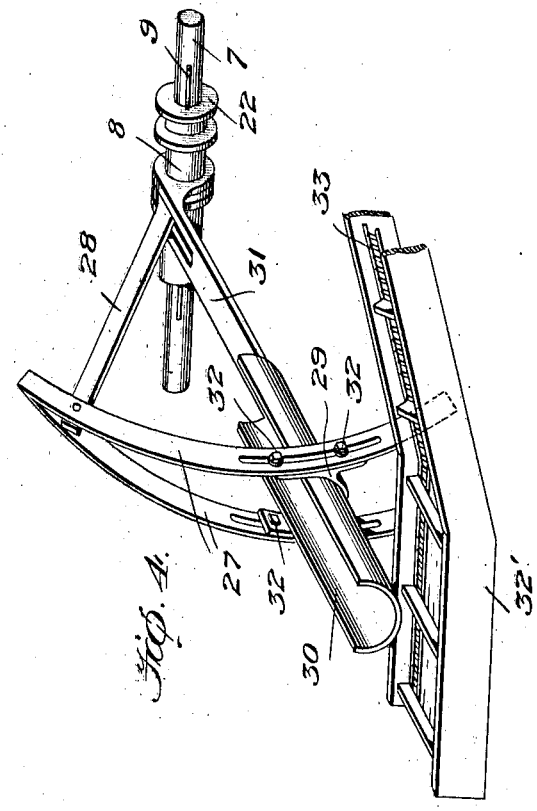
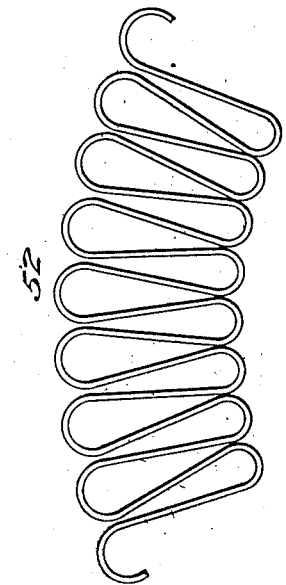
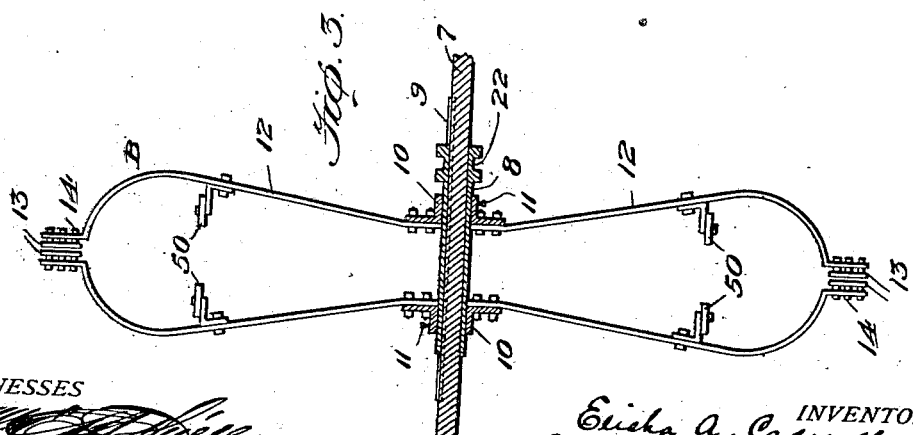
WITNESSES
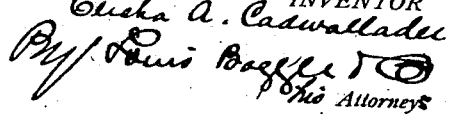
INVENTOR
Elisha A. Cadwallader
His Attorneys

UNITED STATES PATENT OFFICE.

ELISHA A. CADWALLADER, OF WICHITA, KANSAS, ASSIGNOR OF ONE-HALF TO SAMUEL L. CHASTAIN AND ROBERT M. CHASTAIN.

BEET-PICKER.

1,048,457.

Specification of Letters Patent.  Patented Dec. 24, 1912.

Application filed February 3, 1912. Serial No. 675,243.

*To all whom it may concern:*

Be it known that I, ELISHA A. CADWALLADER, a citizen of the United States, residing at Wichita, in the county of Sedgwick and State of Kansas, have invented certain new and useful Improvements in Beet-Pickers, of which the following is a specification.

My invention relates to an improvement in beet pickers and the object is to provide for picking the beets from the ground after the beets have been loosened from the earth and conduct the beets to a suitable receptacle whereby they can be conveyed from the field.

The invention consists of a wheeled frame carrying a rotary picker which conducts the vegetables from the ground to a certain elevation where they are discharged onto an endless conveyer and conveyed by the conveyer to a suitable receptacle.

The invention consists of certain novel features of construction and combination of parts which will be hereinafter described and pointed out in the claims.

In the accompanying drawings:—Figure 1 is a view in side elevation; Fig. 2 is a top plan view; Fig. 3 is a vertical sectional view through the picker wheel; Fig. 4 is a perspective view of the spreader track and discharge spout and a portion of the conveyer; and Fig. 5 is a modification of picker wire.

A represents the frame of the machine and 1 is the pole or tongue connected to the frame to which the draft animals are attached. Hollow bearings 2 are journaled in the frame and journaled in the bearings are axles 3 and 4 upon which axles the wheels 5 are mounted and secured. A yoke 6 is connected to the bearings 2 for keeping the bearings in alinement. A shaft 7 is journaled in the arms 2' connected to the bearings 2 and mounted upon the shaft is the picker wheel B. A sleeve 8 is slidably mounted upon the shaft 7, the sleeve being keyed to the shaft by key 9 and the hubs 10 of the wheel B are mounted upon the sleeve 8 and are held thereto by means of screw bolts 11 whereby the hubs can be moved from and toward each other for regulating the tension of the picker fingers. Picker fingers 12—12 of the wheel B are made preferably of spring metal and connected to each finger is a plate 13 which is fastened to the finger by means of bolts 14. Connected to the fingers by the bolts 14 are a plurality of wires 15. A sprocket wheel 17 is mounted on the axle 3 and a sprocket wheel 18 is mounted on the shaft 7. The sprocket wheels 17 and 18 are connected by a sprocket chain 19 and a clutch 20 on the axle 3 is adapted to be thrown into engagement with the sprocket wheel 17 for locking the sprocket wheel to the axle 3 by means of a lever 21 whereby power can be transmitted to the shaft 7 for rotating the picker wheel B. An annular groove 22 is formed in the sleeve 8 in which the forked end of a rod 22' is received, the other terminal of the rod 22' being connected to the shaft 23 which is mounted in hangers 24 connected to the frame A. A collar 25 is mounted on the shaft 23 and connected thereto is a lever 26 which lever is pivotally connected to the frame A. Upon the movement of this lever the shaft 23 will be caused to slide through its hangers 24 whereby the sleeve 8 will be shifted or slid along the shaft 7 for causing the rotary picker to be moved, the object of this being to bring the picker into position for irregular rows of beets. Diverging curved rails 27 are supported on the sleeve 8 by a bar 28. A bracket 29 is adjustably supported on rails 27 for supporting a trough 30 and a bar 31 is connected to the trough and to the sleeve 8 for securely holding the trough in position, the bar 31 being loosely mounted upon the sleeve 8 to allow for the vertical adjustment of the trough 30 by means of bolts 32 which connect the track 29 to the rails 27.

The rails 27 form a track for spreading the fingers 12 apart for allowing the discharge of the vegetables such as beets from the fingers into the trough 30. As the rotary wheel moves the fingers will be caused to be spread apart as they come into engagement with the track spreader and the fingers will, therefore, be held apart as they come toward the ground which enables the vegetables to be gathered between the fingers as the fingers, after passing the spreader, come toward each other binding the beets between the wires of the two sets of fingers on the hubs 10 and 11 and after the wheel has made a complete revolution and the fingers again come in contact with the spreader the vegetables will be discharged into the trough. In this way it will be seen that some of the fingers are constantly picking up the vegetables during the entire rotation of the wheel and at the same time the vegetables are being discharged from other fingers into the trough. An endless conveyer frame 32' is mounted upon the frame A and mounted on the frame 32' is a conveyer belt 33 onto which the vegetables are discharged from the trough 30 whereby the vegetables will be carried by the endless conveyer away from the picker machine to some suitable receptacle. Sprocket wheel 34 is journaled onto the shaft 35 by which the conveyer belt is propelled and a sprocket wheel 36 is mounted on the shaft 37 supported on the frame A. A sprocket chain 38 connects the wheels 36 and 34 whereby motion will be transmitted to the conveyer belt and beveled pinion 39 is mounted on the shaft 37 which meshes with a beveled gear 40 mounted on the axle 4. A clutch 41 mounted on the axle is adapted to be thrown into an engagement with the gear 40 by lever 42 whereby power can be transmitted through the shaft 37 and chain 38 to the conveyer belt for conducting the fruit or vegetables from the machine. Standards 43 are connected to the frame upon which is journaled a shaft 44. Arms 45 are connected to the shaft 44 to which are connected links 46. The links 46 engage springs 47 which springs are connected to the arms 2'. A lever 48 is connected to the shaft 44 whereby upon the movement of the lever 48 the picker wheel can be raised from the ground as it is carried by the arms 2' so that upon the oscillation of the arms 2' through the springs 47 links 46 and arms 45 the wheel will be raised. A segment 49 is connected to one of the standards 43 so that the lever can be locked in any adjusted position for holding the wheel at any elevation.

The picker wheel is rotated in the same direction as the traction wheels 5, that is of course, after the clutch 20 has been thrown into engagement with the sprocket wheel 17 and during the rotation of the picker wheel in picking up the vegetables to be gathered rollers 50 carried by each of the fingers 12 will come into engagement with the spreader track causing the fingers to be separated for discharging the vegetables into the trough 30, this being clearly shown in Fig. 2, and as the fingers pass from the spreader they will come into engagement with the vegetables on the ground causing the vegetables to be grasped between the adjacent fingers and the strands of wire and thereby carrying the vegetables around with the wheel until the fingers are again engaged by the spreader rails 27, and cause the vegetables to be released from between the fingers.

In the modification shown in Fig. 5 I have disclosed the wire 52 as being bent sinuously. The wire can be constructed of lengths sufficient to extend between the fingers 12 or it can be of such a length as to entirely encircle the wheel and each of the fingers. This is also true of the strands 15 shown in Figs. 1 and 2.

Having fully described my invention, what I claim as new and desire to secure by Letters Patent is:—

1. In a picking machine, the combination with a frame, of a picker wheel rotatably mounted thereon comprising a plurality of fingers, means connecting the fingers together whereby the fruit will be gathered by the fingers and the means connecting the fingers, and means for removing the vegetables from the picker wheel during its rotation.

2. In a picking machine, the combination with a frame, of a picker wheel rotatably mounted thereon comprising a plurality of rows of picking fingers, means connecting the fingers of each row together, and means for removing the vegetables from the fingers.

3. In a picking machine, the combination with a frame, of a picker wheel rotatably mounted thereon comprising a plurality of rows of picking fingers, means connecting the fingers of each row together, and means for separating the fingers for the removal of the vegetables during the rotation of the wheel without interfering with the picking operation.

4. In a picking machine, the combination with a frame, of a shaft mounted on the frame, a sleeve slidably mounted thereon, rotatable picker fingers removably connected to the sleeve, and means for shifting the sleeve for bringing the picker fingers into a position for gathering the fruit.

5. In a picking machine, the combination with a frame, of a shaft mounted on the frame carrying a movable sleeve, a rotatable picker wheel mounted on the sleeve provided with fingers, means for shifting the sleeve for bringing the picker fingers into a position for gathering the fruit, and means for spreading the fingers apart for allowing the discharge of the vegetables from the fingers mounted upon the sleeve and carried thereby.

6. In a picking machine, the combination with a frame having a shaft mounted thereon, of a picking wheel rotatably mounted on the shaft having picking fingers, diverging rails for spreading the fingers apart for removing the vegetables from the fingers, bars journaled to the shaft, one of said bars connected to the rails, a trough adjustably supported by the rails connected to the other bar, said trough adapted to receive the vegetables discharged from the fingers.

In testimony whereof I affix my signature, in the presence of two witnesses.

ELISHA A. CADWALLADER.

Witnesses:
 FRANK MOSBACHER,
 DOROTHY WALLHALL.